United States Patent
Baranton et al.

(10) Patent No.: US 7,857,933 B2
(45) Date of Patent: Dec. 28, 2010

(54) DEVICE FOR APPLYING A COATING ON A LENS, THE DEVICE INCLUDING MEANS FOR INFLATING A MEMBRANE

(75) Inventors: Konogan Baranton, Charenton-le-Pont (FR); Herve Jouffroy, Charenton-le-Pont (FR); Ahmed Haddadi, Charenton-le-Pont (FR); Sean Mahoney, St-Petersburg, FL (US)

(73) Assignee: Essilor International (Compagnie Generale d'Optique), Charenton-le-Pont (FR)

( * ) Notice: Subject to any disclaimer, the term of this patent is extended or adjusted under 35 U.S.C. 154(b) by 210 days.

(21) Appl. No.: 12/375,978

(22) PCT Filed: Jun. 11, 2007

(86) PCT No.: PCT/FR2007/000963

§ 371 (c)(1),
(2), (4) Date: Feb. 2, 2009

(87) PCT Pub. No.: WO2008/015320

PCT Pub. Date: Feb. 7, 2008

(65) Prior Publication Data

US 2009/0308542 A1   Dec. 17, 2009

(30) Foreign Application Priority Data

Aug. 4, 2006   (FR) .................................. 06 07144

(51) Int. Cl.
*B29C 51/28*   (2006.01)

(52) U.S. Cl. ........................ 156/212; 156/580; 156/475

(58) Field of Classification Search ................. 156/212, 156/580, 583.3, 583.8
See application file for complete search history.

(56) References Cited

U.S. PATENT DOCUMENTS

| 3,322,598 | A | * | 5/1967 | Marks ......................... 156/382 |
| 4,564,408 | A | * | 1/1986 | Crumbach et al. .......... 156/212 |
| 6,435,242 | B1 |   | 8/2002 | Reis et al. |

FOREIGN PATENT DOCUMENTS

| WO | 97/35216 | 9/1997 |
| WO | 03/004255 | 1/2003 |

OTHER PUBLICATIONS

International Search Report dated Oct. 10, 2007, from corresponding PCT application.

* cited by examiner

*Primary Examiner*—Khanh Nguyen
*Assistant Examiner*—Vishal I Patel
(74) *Attorney, Agent, or Firm*—Young & Thompson

(57) ABSTRACT

A device for applying a coating film (63) on a face of a lens, the film previously being placed on the face concerned of the lens, includes a seat (40) suitable for receiving the lens, a membrane (62) including a peripheral fixing portion (62A) and an inflatable portion (62B), and an inflater element (61) for inflating the membrane towards the lens seat. The inflater element include a first plate (66) and a second plate (65) with the membrane (62) placed between them, the first plate presenting as a setback a pressurization chamber (80) connected to a source (93) of compressed gas, and the second plate presenting a protrusion opening (71), the two plates being mounted to move relative to each other between an open configuration and a closed configuration.

20 Claims, 3 Drawing Sheets

DEVICE FOR APPLYING A COATING ON A LENS, THE DEVICE INCLUDING MEANS FOR INFLATING A MEMBRANE

TECHNICAL FIELD TO WHICH THE INVENTION APPLIES

The present invention relates in general to fabricating dark and/or correcting ophthalmic lenses for eyeglasses. The invention relates more particularly to an applicator device for applying a coating on a lens, the device including means for inflating a membrane.

TECHNOLOGICAL BACKGROUND

In order to improve the physical and/or optical properties of an ophthalmic lens, it is known to cover its main faces in one or more treatment layers presenting desired optical or physical properties, on one or both faces of the lens. Usually, the lens is dipped in a bath or a coating is applied in liquid form by centrifuging, or indeed by vacuum deposition of mineral or organic layers.

Recently, proposals have been made to use a solid coating in the form of a film that is initially carried by a support, which coating is transferred onto the corresponding face of the lens by adhesive bonding. A difficulty then consists in applying the coating carried by its support against the corresponding face of the lens in such a manner firstly as to ensure that no bubbles of air are held captive between the lens and the coating while it is being applied, and secondly as to spread the adhesive over the entire surface of the lens in order to distribute it in substantially uniform manner without any zones having too little or too much adhesive. It is also appropriate to obtain a thickness of adhesive that is well adapted to holding the coating well on the lens and to preserving the optical properties of the lens.

In an embodiment shown in its FIGS. 3A and 3B, document WO 03/004255 proposes a device for applying a coating film that is carried by a support onto a face of an ophthalmic lens. The device has a seat for receiving the lens and means for inflating a membrane. The support is put into place with its coating film on the face of the lens, with an interface that is disposed between the coating film and the lens. Thereafter the membrane is inflated towards the lens in order to press the coating film against the lens.

Nevertheless, it is found that after a certain number of membrane inflation cycles, the elastic deformation properties of the membrane deteriorate. In addition, while the membrane is being applied against the coating film support, in order to spread the adhesive between the coating film and the lens, the adhesive that is expelled from the sides of the lens can adhere to the membrane, and that is harmful since the membrane then becomes clogged and its elastic deformation properties are modified.

As a result, the membrane runs the risk of no longer deforming as desired and the coating runs the risk of no longer being applied uniformly against the lens without any bubbles of air.

OBJECT OF THE INVENTION

The object of the present invention is to enable the coating film to be applied correctly onto the lens.

To this end, the invention provides a device for applying a coating film on a face of a lens, the film previously being placed on the face concerned of the lens, the device comprising:

a seat suitable for receiving the lens;
a membrane including a peripheral fixing portion and an inflatable portion; and
inflater means for inflating the membrane towards the seat of the lens;
wherein the inflater means comprise a first plate and a second plate between which the membrane is placed, the first plate presenting a setback pressurization chamber connected to a source of compressed gas, and the second plate presenting a protrusion opening, and including mechanical connection means connecting the plates together while enabling them to move relative to each other between an open configuration in which the two plates are spaced apart from each other so as to enable the membrane to be inserted or replaced, and a closed configuration in which the two plates are placed one against the other in such a manner that firstly the pressurization chamber of the first plate and the protrusion opening of the second plate are situated facing the inflatable portion of the membrane, and secondly the peripheral fixing portion of the membrane is held by being pinched between the two plates, the mechanical connection means of the plates being such that the mechanical connection they provide is conserved in the open configuration.

Such a device makes it easy to change the membrane of the inflater means after some given number of utilization cycles, so as to conserve good deformation properties for the membrane, thereby enabling the coating film to be applied correctly onto the lens.

The membrane can be changed quickly since it suffices to move the first plate of the inflater means. The fixing portion of the membrane is then no longer clamped between the two plates and can therefore be removed. In addition, holding the membrane in the inflater means is made easier since when the inflater means are closed, the fixing portion of the membrane is sandwiched between the two plates.

Such a device can also make it easy to change any other removable element of the inflater means involved in inflating the membrane, depending on the intensity and the distribution desired for the pressure, such as elements for guiding deformation of the membrane.

According to a first advantageous characteristic of the invention, the two plates are mounted to pivot relative to each other between their open and closed configurations.

The inflater means can thus easily be opened like a waffle iron by causing the top portion to pivot relative to the bottom portion.

According to another advantageous characteristic of the invention, there are provided locking and clamping means for locking and clamping the plates in their closed configuration. It is then advantageous for the locking and clamping means to be distinct from the mechanical connection means of the plate.

According to another advantageous characteristic of the invention, the protrusion opening of the second plate flares towards the membrane. In particular, the protrusion opening of the second plate is frustoconical.

The frustoconical portion serves firstly to guide deformation of the membrane in the desired direction, e.g. along the axis of the lens. Secondly the cone angle and the diameter of the frustoconical portions act on the curvature of the inflation portion of the membrane, thereby enabling the pressure that is exerted by the membrane on the lens to be distributed in desired manner.

According to another advantageous characteristic of the invention, the protrusion opening is formed in a removable insert fitted on the second plate.

According to another advantageous characteristic of the invention there are provided a plurality of inserts presenting protrusion openings of different widths.

Hinging the plates of the inflater means makes it easier to replace the insert. It is thus easy for the operator to select inserts as a function of the characteristics of the lens and/or of the coating film support.

According to another advantageous characteristic of the invention, the first plate includes a glazed porthole defining at least part of the pressurization chamber and suitable for transmitting ultraviolet radiation.

According to another advantageous characteristic of the invention, the two plates form an extractable subassembly.

The freedom of the inflater means to move relative to the device makes it even easier to replace the membrane of the inflater means, since the inflater means can be moved into an unencumbered zone where they can be opened easily.

According to another advantageous characteristic of the invention, the extractable subassembly formed by the two plates is mounted on slides in such a manner as to be inserted and extracted into and from an associated reception housing like a drawer.

BRIEF DISCRIPTION OF DRAWING

The following description with reference to the accompanying drawings of an embodiment, given by way of non-limiting example, shows clearly what the invention consists in and how it can be reduced to practice.

DETAIL DISCRIPTION OF DRAWING

Figure 1:
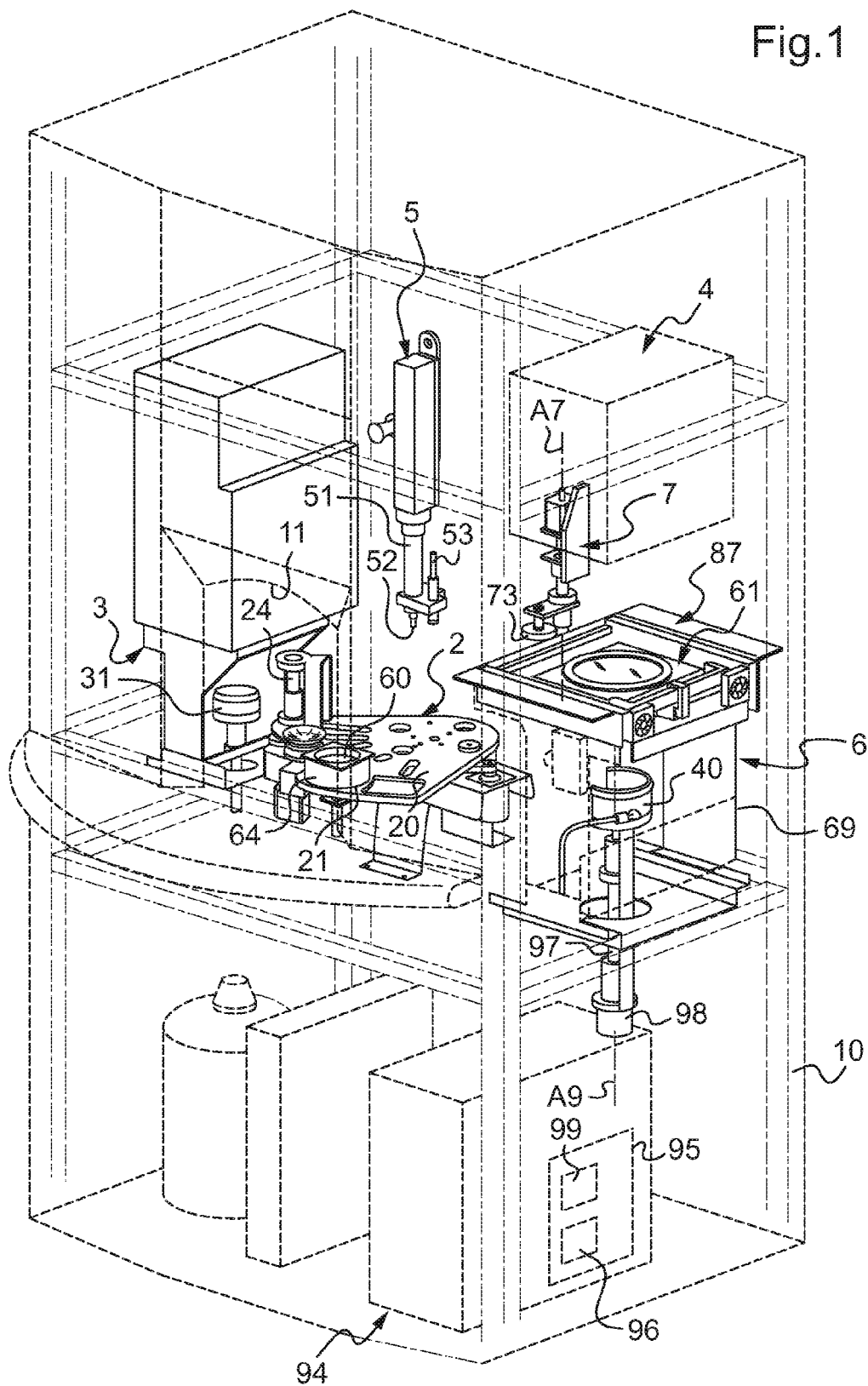
FIG. 1 is an overall perspective view of an apparatus for preparing and transferring a coating.

FIG. 1 shows apparatus for preparing and transferring a coating 63 onto a face 108 of a lens 100. The term lens is used to cover an optical element such as an eyeglass lens, whether correcting or otherwise, an instrument lens, etc. Here, the face 108 of the lens 100 that is to have the coating 63 applied thereto is the concave face 108 of the lens 100. The coating 63 is a water-repellent coating with a thickness of about 50 micrometers.

The coating 63 for transferring is typically in the form of a film that is initially carried by a support 60 enabling it to be handled and packaged. By way of example, the support 60 is constituted by a thin plate of organic material and, specifically, it is elastically flexible.

This preparation and transfer apparatus comprises firstly a frame 10 and a loading and unloading zone defined by an opening 11, or door, serving firstly to load the lens 100 and the support 60 carrying the coating 63 together with its package 64, and secondly to unload the lens 100 once the coating has been deposited on the lens 100.

In order to transfer the coating onto the lens 100, the preparation and transfer apparatus includes the following devices:

- a handler device 7 for handling the coating 63 in order to take hold thereof and place it on the concave face of the lens;
- a cleaner device 3 for cleaning the lens 100;
- an adhesive depositor device 5 for depositing adhesive on the face of the lens 100 and/or on the coating 63;
- an applicator device 6 for applying the coating 63 on the face of the ophthalmic lens, also referred to as an application device 6; and
- a receiver and dispenser device 2 for receiving a lens 100 and suitable for transferring the lens 100 from one device to another.

The apparatus also includes an adhesive hardener device 4. Finally, an electronic processor unit 94 is provided to enable all of these devices to operate in coordinated manner.

These devices are described in greater detail below.

The Dispenser Device

The device 2 for receiving and dispensing the lens 100 essentially comprises a carousel 20 that has freedom of movement in pivoting PIV1 about a first pivot axis A1.

Figure 2:
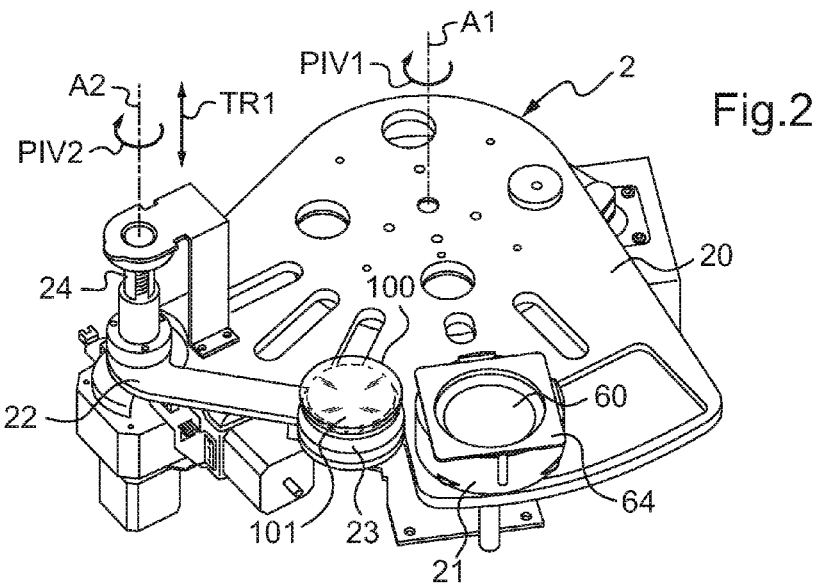
FIG. 2 is a perspective view of a device for receiving and dispensing a lens, the device forming part of the apparatus for preparing and transferring a coating.

As shown in FIG. 2, the carousel 20 includes a housing 21 adapted to receive the support 60 of the coating 63 placed in its packaging 64. The packaging 64 containing the support 60 of the coating 63 rests in the housing 21 with the top face 60A that is opposite from the bottom face 60B carrying the coating 63 facing towards the outside of the package 64, i.e. upwards in the drawing of FIG. 2.

The carousel 20 also has a fork 22 that possesses freedom of movement in pivoting PIV2 about the axis A2 of a bracket 24 secured to the carousel 20, together with freedom of movement in translation TR1 along the axis. The fork also possesses a housing 23.

The Coating Handler Device

The coating handler device 7 includes grip means 73 here constituted by a suction cup movable vertically along an axis A7. The grip means 73 are mounted off-center relative to the axis A7 and also possess freedom of movement in pivoting about said axis A7.

Lens Cleaner Device

The cleaner device 3 has an inlet for enabling the lens to be loaded together with its holder block on a washing base 31. The base is designed firstly to hold the lens and secondly to conserve the orientation of the lens, e.g. by being provided with a shape complementary to the keying element of the holder block, as is the housing 21 in the carousel. Finally, this device includes washing means such as means for spraying jets of water and means for setting the base into rotation so as to dry the lens by centrifuging.

Adhesive Depositor Device

The device 5 for depositing adhesive comprises a motor-driven syringe 51 for dispensing an adhesive 46 that can be hardened by being exposed to ultraviolet (UV) radiation. The syringe is suitable for delivering a precise volume of adhesive at a precise rate. The adhesive depositor device 5 also includes a temperature and humidity sensor 53.

Adhesive Hardener Device

The device 4 for hardening the adhesive 46 is positioned above the device 6 for applying the coating 63 (see FIG. 1) and it includes means for generating UV radiation, e.g. by using xenon gas. It is arranged with the applicator device 6 to be capable of exposing the adhesive 46 to the ultraviolet radiation in such a manner as to cause the adhesive 46 to harden between the coating and the lens. The thickness of the final layer of adhesive 46 lies in the range 3 micrometers to 20 micrometers, and particularly good results are obtained for adhesive having a thickness of about 8 micrometers.

In a variant, provision can be made to use a thermosetting adhesive, in which case the device for exposing the adhesive to UV radiation is replaced by a device enabling the adhesive placed between the lens and the coating to be heated in order to harden it.

Computer and Electronic Processor Unit

The preparation and transfer apparatus includes an electronic and processor unit 94 that contains a program for executing the preparation and transfer method as described below.

Coating Applicator Device

The device 6 for applying the coating 63 comprises firstly a lens seat 40. Since the lens 100 is provided with a holder block 101 embodying its frame of reference, the lens seat 40 is suitable for receiving the holder block 101 on which the lens is held. The lens seat 40 is constituted in this example by a mandrel adapted to clamp onto and hold several different types of holder block.

Figure 3:
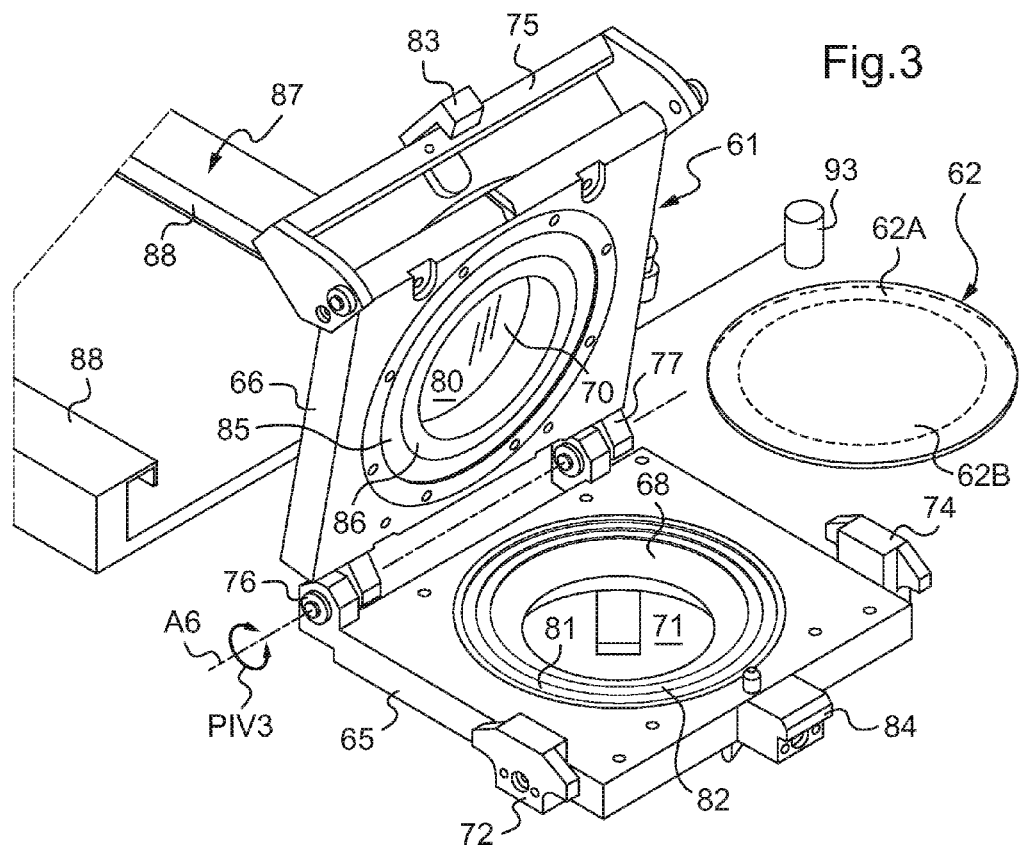
FIG. 3 is a perspective view of a portion of a device forming part of the apparatus and serving to apply the coating on the face of the ophthalmic lens.

As shown in FIG. 3, the applicator device 6 also includes a membrane 62 and inflater means 61 for inflating the membrane 62 towards the lens seat 40. The membrane presents an inflatable portion 62B and a fixing portion 62A.

The inflater means 61 comprise a first plate 66, or top plate, and a second plate 65, or bottom plate, between which the membrane 62 is placed.

The top plate 66 presents a pressurization chamber 80 in a setback, which chamber is connected to a source of compressed gas 93. The pressurization chamber 80 can thus be pressurized to a given value lying in the range 1 bar to 3 bars, and preferably equal to 2 bars.

The top plate 66 also includes a glazed porthole 70 defining part of the pressurization chamber 80 and suitable for transmitting UV radiation. The membrane is also designed to allow UV radiation to pass therethrough (e.g. being made of transparent material).

The bottom face 65 includes a through central opening, and in this example a removable insert that defines a protrusion opening 71 is fitted in this through central opening. The protrusion opening 71 flares towards the membrane 62. In particular, in this example, the protrusion opening 71 of the bottom plate 65 is frustoconical. The smaller section of the cone may be flush with the bottom of the bottom plate (facing towards the seat 40), or it may extend beyond said bottom face forming a projection therefrom. The diameter of the smallest section of the cone is equal to or greater than the diameter of the coating support.

The two plates 66 and 65 are mounted to pivot relative to each other between firstly an open configuration in which the two plates are spaced apart from each other to enable the membrane 62 to be inserted or replaced, and secondly a closed configuration in which the two plates 66 and 65 are pressed one against the other.

The plates 66 and 65 are mounted one on the other by means of hinges 76 and 77 that confer, on the top plate 66, freedom of movement relative to the bottom plate 65 in pivoting PIV3 about a pivot axis A6. A handle 75 is also provided on the top plate 66 enabling the operator to take hold of the top plate 66 so as to cause it to pivot about the pivot axis A6. Locking and clamping means 83 and 84 are also provided for locking and clamping the two plates in their closed configuration. The locking and clamping means 83 and 84 comprise a hook 83 mounted on the handle 75 in such a manner as to engage with a blocking element 84 secured to the bottom plate 65.

In the closed configuration, the two plates 66 and 65 are pressed one against the other in such a manner that firstly the pressurization chamber 80 of the first plate 65 and the protrusion opening 71 of the second plate 66 are situated facing the inflatable portion 62B of the membrane 62, and secondly the peripheral fixing portion 62A of the membrane 62 is held by being pinched between the two plates 66 and 65.

The bottom plate 65 includes stepped circular housings 81 and 82 in a setback configuration, i.e. situated at different depths and having different diameters centered on the protrusion opening of the bottom plate 65. These circular openings 81 and 82 are thus suitable for receiving membranes of diameters corresponding to the diameters of the circular housings 81 and 82. The top plate 66 also has projecting stepped annular portions 85 and 86 of diameters corresponding to the diameters of the circular housings 81 and 82. The annular portions 85 and 86 are designed to pinch the peripheral portion 62A of the membrane 62 in the corresponding circular housing 81 or 82.

This peripheral portion 62A of the membrane 62 thus constitutes the fixing portion 62A of the membrane, and the central portion 62B of the membrane, which central portion is free, constitutes the inflatable portion 62B, or inflation portion, of the membrane.

The protrusion opening 71 serves to guide deformation of the inflatable portion 62 of the membrane laterally while it is being inflated.

In a variant, it is also possible to provide for the through central opening of the bottom plate to present flared walls designed to guide the inflating portion of the membrane so as to form the protrusion opening without any need to have recourse to an insert.

A plurality of inserts 68 are provided presenting protrusion openings 71 of different widths. The operator can thus select the insert that is best adapted for applying the coating on the lens and place it in the through central opening of the bottom plate 65.

The two plates 65 and 66 form an extractable subassembly 61. This extractable subassembly 61 is mounted on slides 88 so as to be inserted in and extracted from an associated reception housing 87 like a drawer. The reception housing 87 is secured to the frame 69 of the applicator device 6.

The bottom plate 65 is provided on its side face with elements 72 and 74 that engage in the slides 88 while the extractable subassembly 61 is being mounted in the reception housing 87. The elements 72 and 74 also constitute means for fastening the extractable subassembly in the associated reception housing 87.

Naturally, during the operation of preparing and transferring the coating on the lens, the extractable subassembly 61 remains secured to the frame 69 of the coating applicator device 6.

In practice, after processing a series of about thirty lenses, the membrane is changed. Provision can also be made to change the insert as a function of the characteristics of the lens and/or of the coating support.

The applicator device 6 includes adjuster means 95 for adjusting the distance Z between the lens seat 40 and the fixing portion 62A of the membrane 62. In this example, these adjuster means 95 are incorporated in the computer and electronic processor unit.

The adjuster means 95 comprise electrical determination means 96 suitable for determining the position to be adjusted of the lens seat 40 relative to the membrane. The adjuster means may comprise an electronics card incorporated in the electronic processor unit 94.

The adjuster means 95 also include control means 97 and 98 for controlling the position of the lens seat 40 relative to the fixing portion 62A of the membrane, which control means are driven by driver means 99. The driver means comprise an electronics card incorporated in the electronic processor unit and they are designed and programmed in such a manner that the lens seat 40 is moved to the determined position by the determination means 96.

These control means 97, 98 comprise an actuator 97 of axis A9 having fastened to one end thereof the lens seat 40, and a motor 98 connected to the other end of the actuator 97 to move the actuator 97 and thus the lens seat 40 in translation TR2 along the axis A9 of the actuator 97.

Method of Preparing and Transferring the Coating onto the Lens

The operator places the support 60 for the coating 63 together with its packaging 64 in the housing 21 of the carousel 20. Here, the support 60 for the coating 63 has a bottom face 60B having the coating 63 for application on the concave face 108 of the lens 100 placed thereon, and it has an opposite top face 60A.

The support 60 is flexible, and its bottom face 60B presents a geometrical configuration similar to that of the concave face 108 of the lens 100, i.e. the bottom face 60B is concave, of curvature similar to the curvature of the concave face 108 of the lens. Preferably, the bottom face 60B of the support 60 presents a radius of curvature that is a little greater than that of the concave face 108 of the lens, such that the peripheral portion of the coating does not touch the peripheral portion of the lens until after the central portion of the coating 63 has been properly applied against the central portion of the concave face 108 of the lens.

The operator positions the lens 100 together with its holder block in the housing 23 of the fork 22.

As mentioned above, the holder block 101 is fitted with a keying shape and the housing 23 of the fork 22 presents a corresponding shape for keying the holder block in such a manner as to enable the holder block 101 to be accurately positioned in the housing 23 while conserving the frame of reference of the lens 100.

Gripping the Coating Support

The carousel 20 pivots to position the housing 21 that receives the support 60 for the coating together with its packaging 64 in register with the coating handler device 7. The gripper means 73 are moved by virtue of their freedom to move in translation along and in pivoting about the axis A7 so as to take hold of the support 60. The gripper means 73 are then raised so as to extract the support 60 from its packaging 64.

Cleaning the Lens

Once the support 60 has been extracted from its packaging 64 and is held by the gripper 73, the carousel 20 pivots to position the housing 23 of the fork 22 that receives the lens 100 and its holder block 101 in register with the cleaner device 3. By virtue of the freedoms of the fork 22 to move in pivoting PIV2 and in translation TR1, the lens 100 is positioned in the cleaner device 3. The lens 100 and its holder block 101 are taken and positioned in the receptacle 31 adapted to hold the lens 100 in a known orientation, e.g. by means of a portion of the receptacle being of a shape that is complementary to the shape of the keying element of the holder block 101.

Once the lens 100 and its holder block 101 are placed in the cleaner device 3, jets of water are directed against the lens 100. Thereafter the lens 100 is dried by centrifuging.

Depositing Adhesive

The carousel 20 pivots counterclockwise to position the housing 23 of the fork 22 that receives the lens 100 and its holder block 101 in register with the adhesive depositor device 5.

The optical frame of reference of the lens 100 is conserved so the geometrical configuration of the concave face 108 of the lens 100 is still fully known. The electronic processor unit then drives movement of the lens 100, using the freedoms to move in translation TR1 along the axis of the bracket 24 and in pivoting PIV2 about said axis A2, in compliance with the geometrical configuration of the lens 100 in such a manner that the tip 52 of the syringe 51 of hardenable adhesive does not touch the lens 100 and in such a manner that no drops of adhesive form on the lens 100. The movement of the lens 100 relative to the syringe of adhesive is thus driven so as to deposit lines or spots of adhesive at accurately localized positions on the concave face 108 of the lens 100.

The adhesive 46 is thus deposited in three dimensions on the lens 100 so as to follow the curvature of the lens 100. In particular, this depositing of adhesive is performed continuously and at a controlled distance from the lens 100 so as to avoid creating drops of adhesive.

Transferring the Coating

The carousel 20 pivots in the counterclockwise direction to position the lens 100 and its holder block 101 in register with the applicator device 6 for applying the coating 63. The freedoms of the fork 22 to move in pivoting and in translation are mainly used to place the lens in the lens seat 40.

Figure 4:
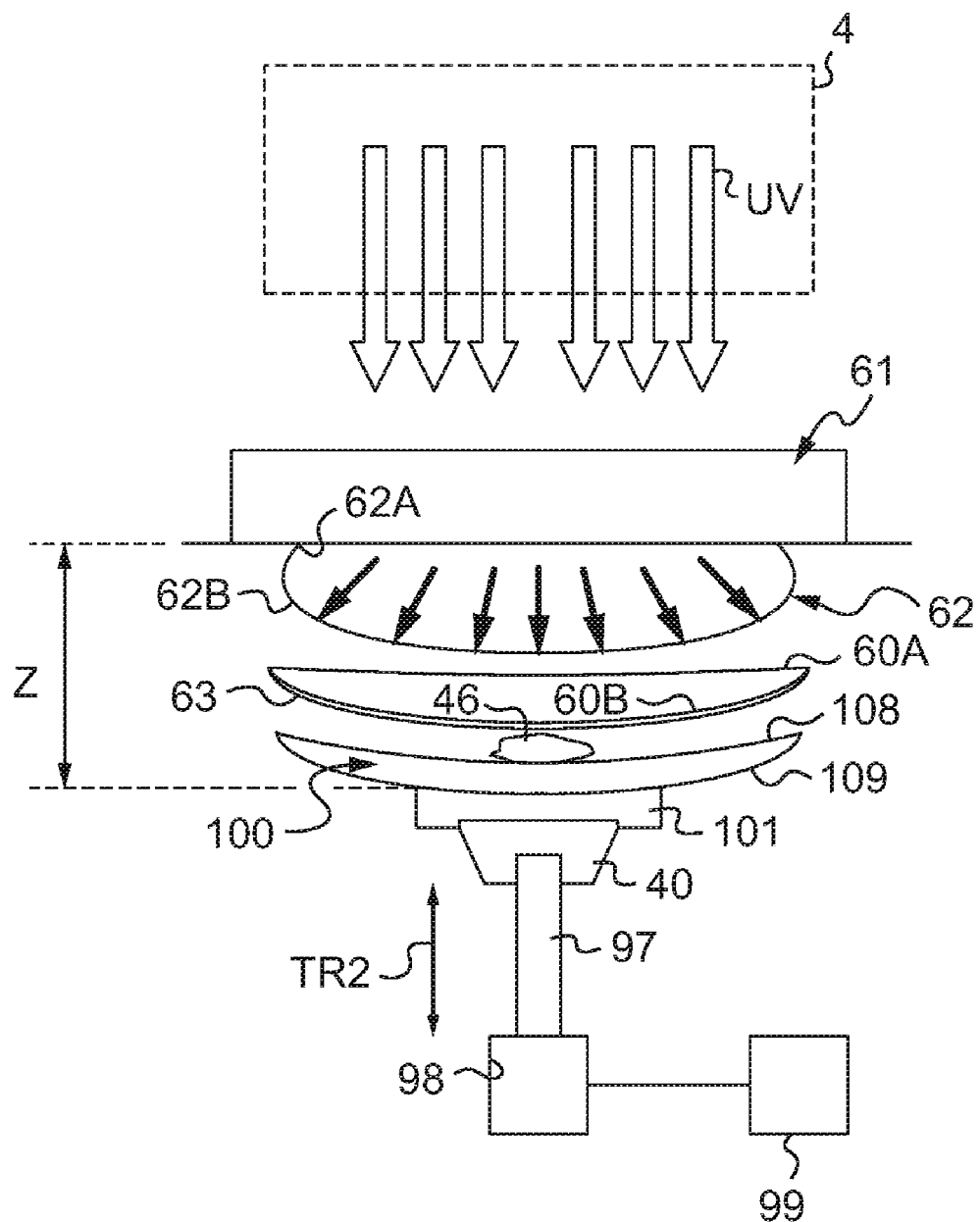
FIG. 4 is a diagrammatic view of the device for applying the coating on the face of the ophthalmic lens.

Thereafter, the grip means 73 of the handler device 7 places the support 60 of the coating 63 via the bottom face 60B carrying the coating 63 gently on the concave face 108 of the lens 100 having the hardenable adhesive 46 deposited thereon (FIG. 4).

The adjuster means 95 are then used to adjust the position of the lens 100 relative to the membrane 62, this adjustment being distinct from inflation of the membrane 62. For this purpose, the determination means 96 determine the position to be adjusted of the lens seat relative to the membrane depending on one or more physical or geometrical characteristics of the lens. In a variant, it is also possible to determine the position to be adjusted of the lens seat as a function of physical or geometrical characteristics of the coating itself and/or of the membrane and/or of the insert.

Thereafter, the chamber for pressurizing the inflater means 61 is pressurized and the membrane inflates (FIG. 4) to extend as a hernia through the protrusion opening 71 in the bottom plate 65. The central portion of the membrane 62 is the first to press against the central portion of the top face 60B of the support which transmits the pressure force to the central portion of the concave face 108 of the prepositioned lens. Thereafter, as it inflates, the membrane 62 exerts a pressure force that extends progressively from the center towards the periphery of the concave face 108 of the lens (via the support 60). The coating 63 is thus applied to the lens 100 starting from the center of the lens and progressing towards its periphery and at the same time the adhesive 46 is expelled from the center towards the periphery of the lens.

The invention claimed is:

1. A device for applying a coating film (63) on a face (108) of a lens (100), the film previously being placed on the face concerned of the lens, the device comprising:
   a seat (40) suitable for receiving the lens (100);
   a membrane (62) including a peripheral fixing portion (62A) and an inflatable portion (62B); and inflater means (61) for inflating the membrane (62) towards the seat (40) of the lens (100);

the device being characterized in that the inflater means (61) comprise a first plate (66) and a second plate (65) between which the membrane (62) is placed, the first plate presenting a setback pressurization chamber (80) connected to a source (93) of compressed gas, and the second plate presenting a protrusion opening (71), and in that it includes mechanical connection means (76, 77, A6) connecting the plates (65, 66) together while enabling them to move relative to each other between an open configuration in which the two plates are spaced apart from each other so as to enable the membrane (62) to be inserted or replaced, and a closed configuration in which the two plates (65, 66) are placed one against the other in such a manner that firstly the pressurization chamber (80) of the first plate (65) and the protrusion opening (71) of the second plate (66) are situated facing the inflatable portion (62B) of the membrane (62), and secondly the peripheral fixing portion (62A) of the membrane (62) is held by being pinched between the two plates (65, 66), the mechanical connection means (76, 77, A6) of the plates (65, 66) being such that the mechanical connection they provide is conserved in the open configuration.

2. A device according to claim 1, characterized in that the two plates (65, 66) are mounted to pivot relative to each other between their open and closed configurations.

3. A device according to claim 1, characterized in that it includes locking and clamping means (83, 84) for locking and clamping the plates in their closed configuration.

4. A device according to claim 3, characterized in that the locking and clamping means (83, 84) are distinct from the mechanical connection means (76, 77, A6) of the plates (65, 66).

5. A device according to claim 1, characterized in that the protrusion opening (71) of the second plate (65) flares towards the membrane (62).

6. A device according to claim 5, characterized in that the protrusion opening (71) of the second plate (65) is frustoconical.

7. A device according to claim 1, characterized in that the protrusion opening (71) is formed in a removable insert (68) fitted on the second plate (65).

8. A device according to claim 7, characterized in that it includes a plurality of inserts (68) presenting protrusion openings (71) of different widths.

9. A device according to claim 1, characterized in that the first plate (66) includes a glazed porthole (70) defining at least part of the pressurization chamber (80) and suitable for transmitting ultraviolet radiation (UV).

10. A device according to claim 1, characterized in that the two plates (65, 66) form an extractable subassembly (61).

11. A device according to claim 10, characterized in that the extractable subassembly (61) formed by the two plates (65, 66) is mounted on slides (88) in such a manner as to be inserted and extracted into and from an associated reception housing (87) like a drawer.

12. A device according to claim 2, characterized in that it includes locking and clamping means (83, 84) for locking and clamping the plates in their closed configuration.

13. A device according to claim 2, characterized in that the protrusion opening (71) of the second plate (65) flares towards the membrane (62).

14. A device according to claim 3, characterized in that the protrusion opening (71) of the second plate (65) flares towards the membrane (62).

15. A device according to claim 4, characterized in that the protrusion opening (71) of the second plate (65) flares towards the membrane (62).

16. A device according to claim 2, characterized in that the protrusion opening (71) is formed in a removable insert (68) fitted on the second plate (65).

17. A device according to claim 3, characterized in that the protrusion opening (71) is formed in a removable insert (68) fitted on the second plate (65).

18. A device according to claim 4, characterized in that the protrusion opening (71) is formed in a removable insert (68) fitted on the second plate (65).

19. A device according to claim 5, characterized in that the protrusion opening (71) is formed in a removable insert (68) fitted on the second plate (65).

20. A device according to claim 6, characterized in that the protrusion opening (71) is formed in a removable insert (68) fitted on the second plate (65).

* * * * *